(12) United States Patent
Linzer

(10) Patent No.: US 8,872,930 B1
(45) Date of Patent: Oct. 28, 2014

(54) DIGITAL VIDEO CAMERA WITH INTERNAL DATA SAMPLE COMPRESSION

(75) Inventor: Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 561 days.

(21) Appl. No.: 12/606,495

(22) Filed: Oct. 27, 2009

(51) Int. Cl.
*H04N 5/228* (2006.01)

(52) U.S. Cl.
USPC ......... 348/222.1; 382/166; 382/232; 382/254

(58) Field of Classification Search
CPC ................. H04N 19/00127; H04N 19/00296; H04N 19/00757; H04N 19/00278; H04N 19/00472; H04N 19/00315
USPC .......................... 348/222.1; 382/166, 232, 254
See application file for complete search history.

(56) References Cited

U.S. PATENT DOCUMENTS

| | | | |
|---|---|---|---|
| 4,575,754 A * | 3/1986 | Bar-Zohar | 380/215 |
| 5,483,354 A * | 1/1996 | Kessels et al. | 358/444 |
| 6,125,140 A * | 9/2000 | Wilkinson | 375/240 |
| 6,618,442 B1 * | 9/2003 | Chen et al. | 375/240.2 |
| 2001/0002845 A1 * | 6/2001 | Tamashima | 348/220 |
| 2002/0009143 A1 * | 1/2002 | Arye | 375/240.16 |
| 2004/0179608 A1 * | 9/2004 | Holliman et al. | 375/240.25 |
| 2006/0098952 A1 * | 5/2006 | Fujimoto et al. | 386/111 |
| 2007/0223824 A1 * | 9/2007 | Kato et al. | 382/232 |
| 2009/0116554 A1 * | 5/2009 | Ma et al. | 375/240.16 |
| 2009/0226102 A1 * | 9/2009 | Huang et al. | 382/233 |

OTHER PUBLICATIONS

Micron Technology, Inc., Boise, ID, "½-Inch 3-Megapixel CMOS Active-Pixel Digital Image Sensor" data sheet, Rev C, Sep. 2004.

* cited by examiner

*Primary Examiner* — Antoinette Spinks
(74) *Attorney, Agent, or Firm* — Christopher P. Maiorana, PC

(57) ABSTRACT

An apparatus generally comprising a first encoder, a decoder and a second encoder is disclosed. The first encoder may be configured to generate a plurality of first compressed samples from a plurality of data samples of a picture. The data samples generally include a plurality of luminance samples and chrominance samples created internal to a digital video camera. The decoder may be configured to generate a plurality of reconstructed samples from the first compressed samples. The second encoder may be configured to generate a plurality of second compressed samples based on the reconstructed samples.

20 Claims, 14 Drawing Sheets

Y (LUMINANCE) SAMPLES

```
  0   1   2   3   4   5   6   7   8   9  10  11  12  13  14  15
 16  17  18  19  20  21  22  23  24  25  26  27  28  29  30  31
 32  33  34  35  36  37  38  39  40  41  42  43  44  45  46  47
 48  49  50  51  52  53  54  55  56  57  58  59  60  61  62  63
 64  65  66  67  68  69  70  71  72  73  74  75  76  77  78  79
 80  81  82  83  84  85  86  87  88  89  90  91  92  93  94  95
 96  97  98  99 100 101 102 103 104 105 106 107 108 109 110 111
112 113 114 115 116 117 118 119 120 121 122 123 124 125 126 127
128 129 130 131 132 133 134 135 136 137 138 139 140 141 142 143
144 145 146 147 148 149 150 151 152 153 154 155 156 157 158 159
160 161 162 163 164 165 166 167 168 169 170 171 172 173 174 175
176 177 178 179 180 181 182 183 184 185 186 187 188 189 190 191
192 193 194 195 196 197 198 199 200 201 202 203 204 205 206 207
208 209 210 211 212 213 214 215 216 217 218 219 220 221 222 223
224 225 226 227 228 229 230 231 232 233 234 235 236 237 238 239
240 241 242 243 244 245 246 247 248 249 250 251 252 253 254 255
```

U SAMPLES

```
256 258 260 262 264 266 268 270
272 274 276 278 280 282 284 286
288 290 292 294 296 298 300 302
304 306 308 310 312 314 316 318
320 322 324 326 328 330 332 334
336 338 340 342 344 346 348 350
352 354 356 358 360 362 364 366
368 370 372 374 376 378 380 382
```

V SAMPLES

| | | | |
|---|---|---|---|
| ABOVE-LEFT-LEFT | ABOVE-LEFT | ABOVE | ABOVE-RIGHT |
| LEFT-LEFT-LEFT | LEFT-LEFT | LEFT | TARGET |

FIG. 6

CHROMA

| AL | A |
|---|---|
| L | TARGET |

HOR = ABS(AL-A);
VER = ABS(AL-L);
IF (HOR < (VER/2)), PREDICTOR = L;
ELSE IF (VER < (HOR/2)), PREDICTOR = A;
ELSE PREDICTOR = (A+L)/2.
ON THE TOP ROW OF THE MACROBLOCK, PREDICTOR = L.

LUMA

|   | F | D | B | C |
|---|---|---|---|---|
| A | E |   | TARGET |   |

VER = ABS(F-E);
HOR = ABS(D-B);
IF (HOR < (VER/4)), PREDICTOR = E;
ELSE IF (VER < (HOR/4), PREDICTOR = B;
ELSE PREDICTOR = (E+B)/2.
ON THE TOP ROW OF THE MACROBLOCK, PREDICTOR = E.

FIG. 7

CHROMA
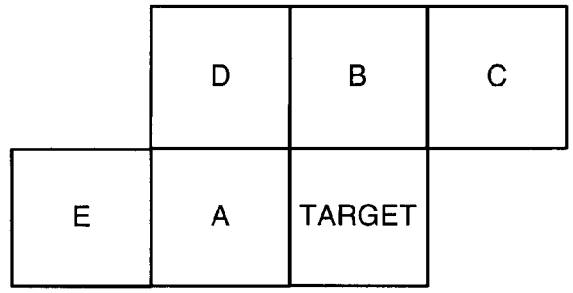
IF ( TOP OF MACROBLOCK )
    SUM = 4*ABS(A-E);
ELSE
    SUM = ABS(A-D)*2;
    SUM += ABS(D-B);
    IF( ON RIGHT SIDE )
        SUM += ABS(D-B)
    ELSE
        SUM += ABS(B-C);
SCORE = SUM >> DPCM_LOSSY_SHIFT.
LUMA
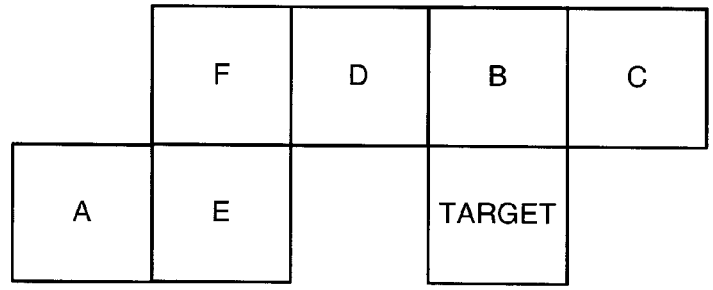
IF ( TOP OF MACROBLOCK )
    SUM = 4*ABS(A-E);
ELSE
    SUM = ABS(F-E)*2;
    SUM += ABS(D-B);
    IF ( ON RIGHT SIDE )
        SUM += ABS(D-B)
    ELSE
        SUM+= ABS(B-C);
SCORE = SUM >> DPCM_LOSSY_SHIFT.
FIG. 11

TABLE I

| ABS(DIFF) | FLC | CONTEXT 0 | | CONTEXT 1 | | CONTEXT 2 | |
|---|---|---|---|---|---|---|---|
| | | LGTH | VLC | LGTH | VLC | LGTH | VLC |
| 0 | N/A | 1 | 0 | 2 | 01 | 3 | 110 |
| 1 | SIGN | 2 | 11 | 2 | 10 | 5 | 00100 |
| 2 | SIGN | 3 | 100 | 3 | 110 | 5 | 00101 |
| 3 | SIGN | 4 | 1010 | 3 | 001 | 4 | 0001 |
| [4 ... 7] | 3 BITS | 5 | 10111 | 3 | 111 | 2 | 10 |
| [8 ... 15] | 4 BITS | 6 | 101101 | 4 | 0001 | 2 | 01 |
| [16 ... 31] | 5 BITS | 7 | 1011001 | 5 | 00001 | 3 | 111 |
| [32 ... 63] | 6 BITS | 8 | 10110000 | 6 | 000001 | 4 | 0011 |
| ALL OTHERS | 8-PCM_LOSSY_SHIFT BITS | 8 | 10110001 | 6 | 000000 | 4 | 0000 |

FIG. 13

DIGITAL VIDEO CAMERA WITH INTERNAL DATA SAMPLE COMPRESSION

CROSS REFERENCE TO RELATED APPLICATIONS

This application is related to co-pending U.S. application Ser. No. 12/570,104, filed Sep. 30, 2009, which is hereby incorporated by reference in its entirety.

FIELD OF THE INVENTION

The present invention relates to a method and/or architecture for a digital camera generally and, more particularly, to a digital video camera with internal data sample compression.

BACKGROUND OF THE INVENTION

Referring to FIG. 1, a block diagram of a conventional digital camera 20 is shown. A sensor 22 converts optical pictures into electronic pictures. A digital signal processor (DSP) 24 of the camera 20 includes an image processing circuit 26 that processes the electronic pictures into an intended format, a final size and a specified quality. A memory 28 (i.e., digital random access memory (DRAM)) is in communication with the DSP 24 to buffer processed image data created by the image processing circuit 26. A compression circuit 30 compresses and encodes the image data into a standard storage or transmission format, such as JPEG (Joint Photographic Experts Group), MPEG-2 (Motion Picture Expert Group) or H.264/AVC ("Advanced Video Coding" specification). The compressed data is buffered in the memory 28. A driver circuit 32 reads the compressed data from the memory 28 and conveys the compressed data to a storage media or a transmission media.

During operations, the digital camera 20 reads and writes large amounts of image data to and from the memory 28. Transfers of the image data can significantly increase a power consumption and a cost of the digital camera 20 since more expensive or more external memory 28 chips are used to accommodate the increased bandwidth. Moreover, space must be allocated within the memory 28 for the image data resulting in large or expensive DRAMs.

As such, having a method to reduce the power and cost associated with storing and reading large amounts of image data to and from an external DRAM is desirable.

SUMMARY OF THE INVENTION

The present invention concerns an apparatus generally including a first encoder, a decoder and a second encoder. The first encoder may be configured to generate a plurality of first compressed samples from a plurality of data samples of a picture. The data samples generally include a plurality of luminance samples and chrominance samples created internal to a digital video camera. The decoder may be configured to generate a plurality of reconstructed samples from the first compressed samples. The second encoder may be configured to generate a plurality of second compressed samples based on the reconstructed samples.

The objects, features and advantages of the present invention include providing a method and/or apparatus for a digital video camera with internal data sample compression that may (i) reduce a power consumption compared with conventional designs, (ii) reduce cost compared with conventional designs, (iii) store image data in a compressed form and/or (iv) implement two different forms of image data compression.

BRIEF DESCRIPTION OF THE DRAWINGS

These and other objects, features and advantages of the present invention will be apparent from the following detailed description and the appended claims and drawings in which:

FIG. 5 is a diagram of an example ordering of samples within a macroblock;

FIG. 6 is a diagram illustrating an example layout of reconstructed neighbor samples as related to a target sample;

FIG. 7 is a diagram of example neighbor samples used to compute a prediction sample;

FIG. 11 is a diagram of example neighbor samples used to compute a context score;

FIG. 13 is a Table I illustrating a variable length code; and

DETAILED DESCRIPTION OF THE PREFERRED EMBODIMENTS

Figure 1:
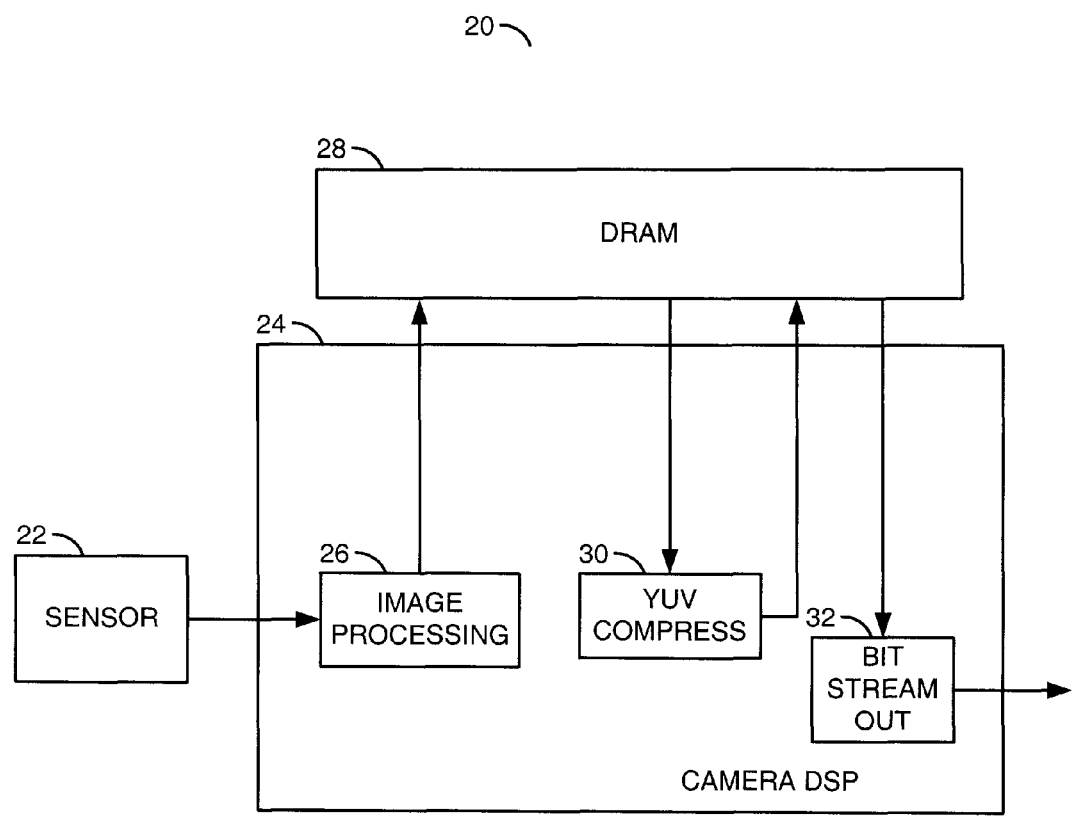
FIG. 1 is a block diagram of a conventional digital camera.
Figure 2:
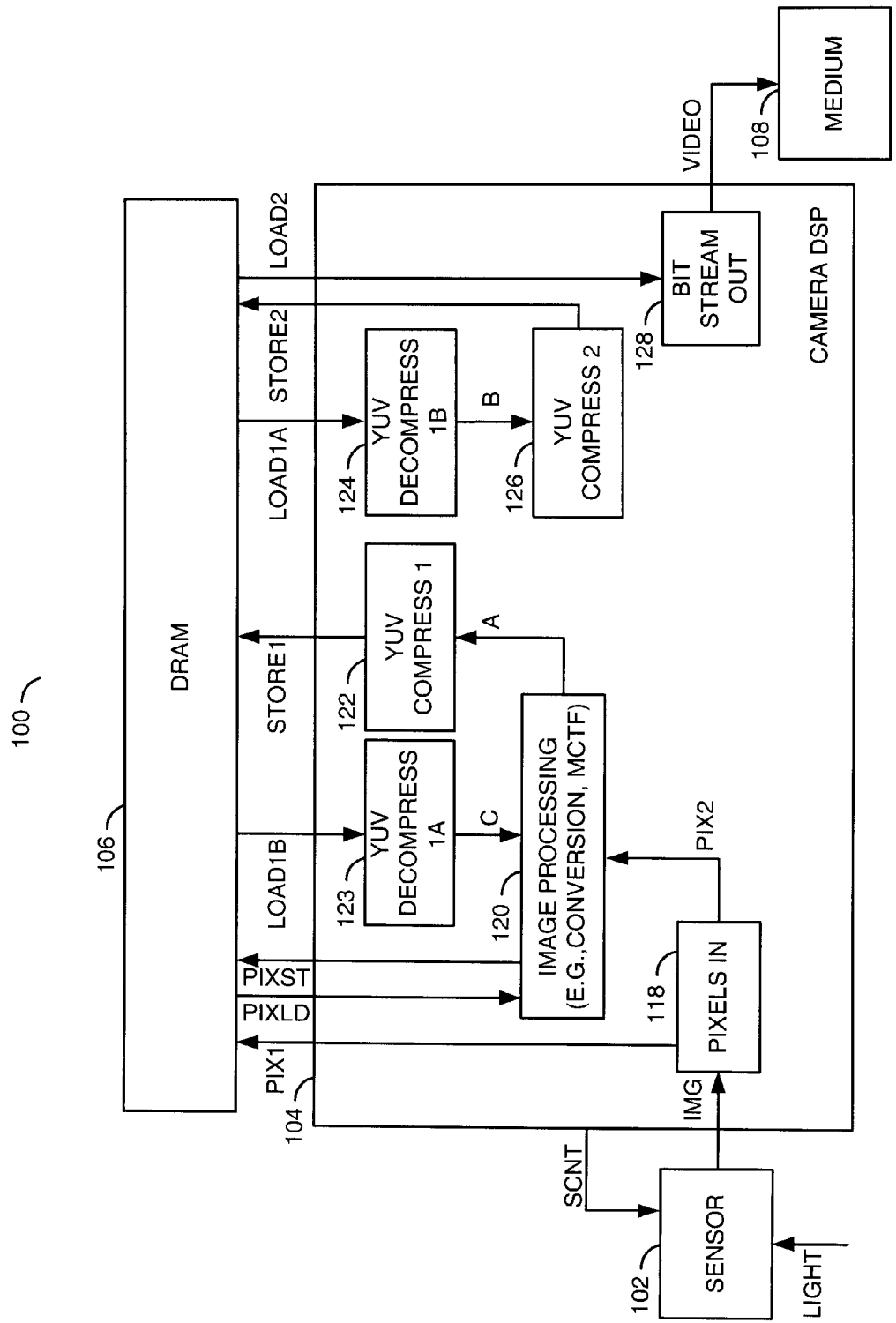
FIG. 2 is a block diagram of an example implementation of an apparatus in accordance with a preferred embodiment of the present invention.

Referring to FIG. 2, a block diagram of an example implementation of an apparatus 100 is shown in accordance with a preferred embodiment of the present invention. The apparatus (or camera) 100 generally comprises a circuit (or module) 102, a circuit (or module) 104, a circuit (or module) 106 and a circuit (or module) 108. The circuits 102 to 108 may be implemented in hardware, software, firmware or any combination thereof. In some embodiments, the apparatus 100 may implement a digital video camera.

An optical signal (e.g., LIGHT) may be received by the circuit 102. The circuit 102 may generate and present a digital signal (e.g., IMG) to the circuit 104. A control signal (e.g., SCNT) may be generated and presented from the circuit 104 to the circuit 102. The circuit 104 may generate and present a video signal (e.g., VIDEO) to the circuit 108. A signal (e.g., PIX1) may be generated by the circuit 104 and transferred to the circuit 106. Another signal (e.g., PIXST) may be presented from the circuit 104 to the circuit 106. The circuit 106 may present a signal (e.g., PIXLD) back to the circuit 104. A signal (e.g., LOAD1A) may be generated by the circuit 106 and presented to the circuit 104. A signal (e.g., STORE1) may be presented from the circuit 104 to the circuit 106. The circuit 106 may generate and present a signal (e.g., LOAD1B) to the circuit 104. The circuit 104 may generate another signal (e.g., STORE2) transferred to the circuit 106. A signal (e.g., LOAD2) may be generated by the circuit 106 and presented to the circuit 104. The signals PIX1, PIXLD, PIXST, LOAD1A, STORE1, LOAD1B, STORE2 and LOAD2 may be implemented using address, data and command signals communicated between the circuits 104 and 106.

The circuit 102 is generally implemented as a sensor (or detector) circuit. The circuit 102 may be operational to convert the optical image received in the signal LIGHT into the digital signal IMG in response to the signal SCNT. The digital signal IMG may convey one or more optical images as one or more electronic images or frames. The control signal SCNT may carry windowing, binning, read rate, offset, scaling, color correction and other information for use by the circuit 102. The electronic frames may be generated having an initial resolution (e.g., a horizontal number of image samples by a vertical number of image samples) and an initial color space (e.g., a Bayer color space) at an initial data rate. An example implementation of the circuit 102 may be an MT9T001 3-megapixel digital image sensor available from Micron Technology, Inc., Bosie, Id.

The circuit 104 may implement a digital signal processor (DSP) circuit. The circuit 104 may be configured to generate the signal VIDEO by processing the one or more electronic images received in the digital signal IMG. The circuit 104 may also be operational to generate the control signal SCNT. The signal VIDEO generally comprises a video bitstream (e.g., ITU-R BT.656-4, ITU-R BT.709, SMPTE 240M, H.264/AVC, MPEG-2, MPEG-4) having a sequence of pictures (or frames). In some embodiments, the circuit 102 and the circuit 104 may be fabricated in (on) separate dies. In other embodiments, the circuit 102 and the circuit 104 may be fabricated in (on) the same die.

The circuit 106 may implement an external memory circuit. In some embodiments, the circuit 106 may be designed as a dynamic random access memory (DRAM). The circuit 106 may be operational to store image data (e.g., luminance and chrominance) temporarily for the circuit 104. In some embodiments, the circuit 106 may be fabricated as one or more dies separate from the circuit 104 fabrication. In other embodiments, the circuit 106 may be fabricated in (on) the same die as the circuit 104.

The circuit 108 may be referred to as a medium. The medium generally comprises one or more nonvolatile memory devices and/or one or more transmission media capable of storing/transmitting the video stream received in the signal VIDEO. In some embodiments, the circuit 108 generally comprises a nonvolatile memory device. For example, a recording circuit 108 may be implemented as a FLASH memory or a micro hard disk drive (also known as a "1-inch" hard drive). In some embodiments, the recording circuit 108 may be implemented as a tape medium or an optical medium. A transmitting circuit 108 may be implemented as a wired, wireless and/or optical medium. Other types of media may be implemented to meet the criteria of a particular application.

The circuit 104 generally comprises a circuit (or module) 118, a circuit (or module) 120, a circuit (or module) 122, a circuit (or module) 123, a circuit (or module) 124, a circuit (or module) 126 and a circuit (or module) 128. The circuits 118 to 128 may be implemented in hardware, software, firmware or any combination thereof.

The signal IMG may be received by the circuit 118. The signal VIDEO may be generated by the circuit 128. A signal (e.g., PIX2) may be generated by the circuit 118 and presented to the circuit 120. A signal (e.g., A) may be generated by the circuit 120 and presented to the circuit 122. The circuit 122 may generate the signal STORE1. The signal LOAD1A may be received by the circuit 124 from the circuit 106. The circuit 124 may generate a signal (e.g., B) that is presented to the circuit 126. The circuit 126 may generate the signal STORE2 that is transferred to the circuit 106. The circuit 106 may generate the signal LOAD2 received by the circuit 128. The circuit 118 may generated the signal PIX1. The signal PIXST may be generated by the circuit 120. The signal PIXLD may be received by the circuit 120. The circuit 123 may receive the signal LOAD1B from the circuit 106. A signal (e.g., C) may be generated by the circuit 123 and presented to the circuit 120.

The circuit 118 may implement a routing circuit. The circuit 118 is generally operational to route the image data (e.g., RGB pixels) received from the circuit 102 to the circuit 106 via the signal PIX1. The circuit 118 may also route the image data received in the signal IMG to the circuit 120 in the signal PIX2. In some embodiments, the circuit 118 may send the image data to both the circuit 106 and the circuit 120 simultaneously.

The circuit 120 may implement an image processing circuit. The circuit 120 is generally operational to process the pictures received in the signal PIX2 and/or PIXLD into a format close to a final format of the signal VIDEO. The processing may include, but is not limited to, digital gain and digital offsets, color correction, demosaicing, conversion from RGB to YUV format, motion compensated temporal filtering (MCTF), binning and skipping corrections, down converting, interpolations, image sharpening, image noise reduction and/or image smoothing. In some applications, the circuit 120 may return some or all of the image data (e.g., RGB data) to the circuit 106 via the signal PIXST for temporary storage. Some or all of the image data (e.g., YUV data) may also be presented in the signal A to the circuit 122.

The circuit 122 may implement a compression/encoder circuit. During and/or after image processing, the YUV data is generally compressed and encoded before being sent to the circuit 106 in the signal STORE1. The circuit 122 may be operational to compress and encode the processed image data received from the circuit 120 in the signal A. In some embodiments, the compression may comprise a lossy compression.

The circuit 123 may implement a decompression/decoder circuit. The circuit 123 is generally operational to decode and decompress the compressed YUV data received from the circuit 106 via the signal LOAD1B. The circuit 123 generally approximately reverses the compression and encoding of the circuit 122. The recovered YUV data may be presented in the signal C to the circuit 120.

The circuits 122 and 123 may be used by the circuit 120 to store and retrieve the YUV data to and from the circuit 106. Storing the YUV data from the circuit 120 to the circuit 106 generally uses the circuit 122 to compress the data. Reading the YUV data from the circuit 106 back to the circuit 120 may use the circuit 123 to decompress the data. Because the YUV data is transferred to and from the circuit 106 in a compressed form, the bandwidth of the circuit 106 consumed by the transfers is generally reduced compared with transfers of noncompressed YUV data.

The image data (e.g., RGB data and/or YUV data) is generally stored and read from the circuit 106 where one or more of the following conditions apply. In a first condition, the processing of the image data by the circuit 120 may occur in a different order (sequence) than the order (sequence) in which the image data is received from the circuit 102. For example, the circuit 120 may use a striping order whereas the circuit 102 uses a raster order. In a second condition, the circuit 120 may process more than one picture at a time. For example, MCTF processing of a current picture generally involves one or more temporally neighboring pictures buffered in the circuit 106. In a third condition, the image data may be consumed in a different order than processed. For example, picture reordering (e.g., B picture) may be implemented where the circuit 120 processes the image data in the order received from the circuit 118 while the circuits 124-128 present the pictures in the signal VIDEO in a transmission order. Other conditions may be implemented to meet the criteria of a particular application.

The circuit 124 may implement another decompression/decoder circuit. The circuit 124 is generally operational to decode and decompress the compressed YUV data received from the circuit 106 via the signal LOAD1A. The circuit 124 generally approximately reverses the compression and encoding of the circuit 122. The recovered YUV data may be presented in the signal B to the circuit 126 for final compression. In some embodiments, the circuits 123 and 124 may be implemented apart from each other. In other embodiments, the circuit 123 and the circuit 124 may be implemented as the same hardware, software and/or firmware and time shared.

The circuit 126 may implement another compression/encoder circuit. The circuit 126 is generally operational to compress and encode the recovered YUV data received in the signal B. The compressed/encoded recovered YUV data may be stored back in the circuit 106 via the signal STORE2. The compression and/or encoding performed by the circuit 126 is generally different from the compression and encoding performed by the circuit 122. The compressed/encoded data in the signal STORE2 may be compliant with one or more of the JPEG standard, MPEG-2 standard, H.264/AVC standard, other digital video standards and/or proprietary digital video specifications. The circuit 126 generally compresses the YUV data for external use outside of the apparatus 100.

The circuit 128 may implement a bitstream driver circuit. The circuit 128 may be operational to transfer the compressed/encoded data received in the signal LOAD2 to the circuit 108. Different configurations of the circuit 128 may be implemented to meet the criteria of the circuit 108. For example, where the circuit 108 is implemented as a FLASH memory, the circuit 128 may be implemented as a FLASH driver circuit. Where the circuit 108 is implemented as a transmission medium, the circuit 128 may be implemented as a corresponding driver circuit.

The circuits 122 and 123 generally compress and decompress the YUV data for internal use within the apparatus 100. The compressed YUV data created by the circuit 122 may be kept internal to the apparatus 100 and is not intended for external use. Therefore, the compression/encoding techniques implemented by the circuit 122, and the decompression/decoding techniques implemented by the circuits 123 and 124, may be simple and inexpensive. The resulting compression ratio may be relatively modest. For example, in some embodiments the compression ratio of the circuit 122 may be 2:1 or less. By comparison, the compression ratio of the circuit 126 creating an H.264/AVC compliant stream may be 20:1 or more.

Figure 3:
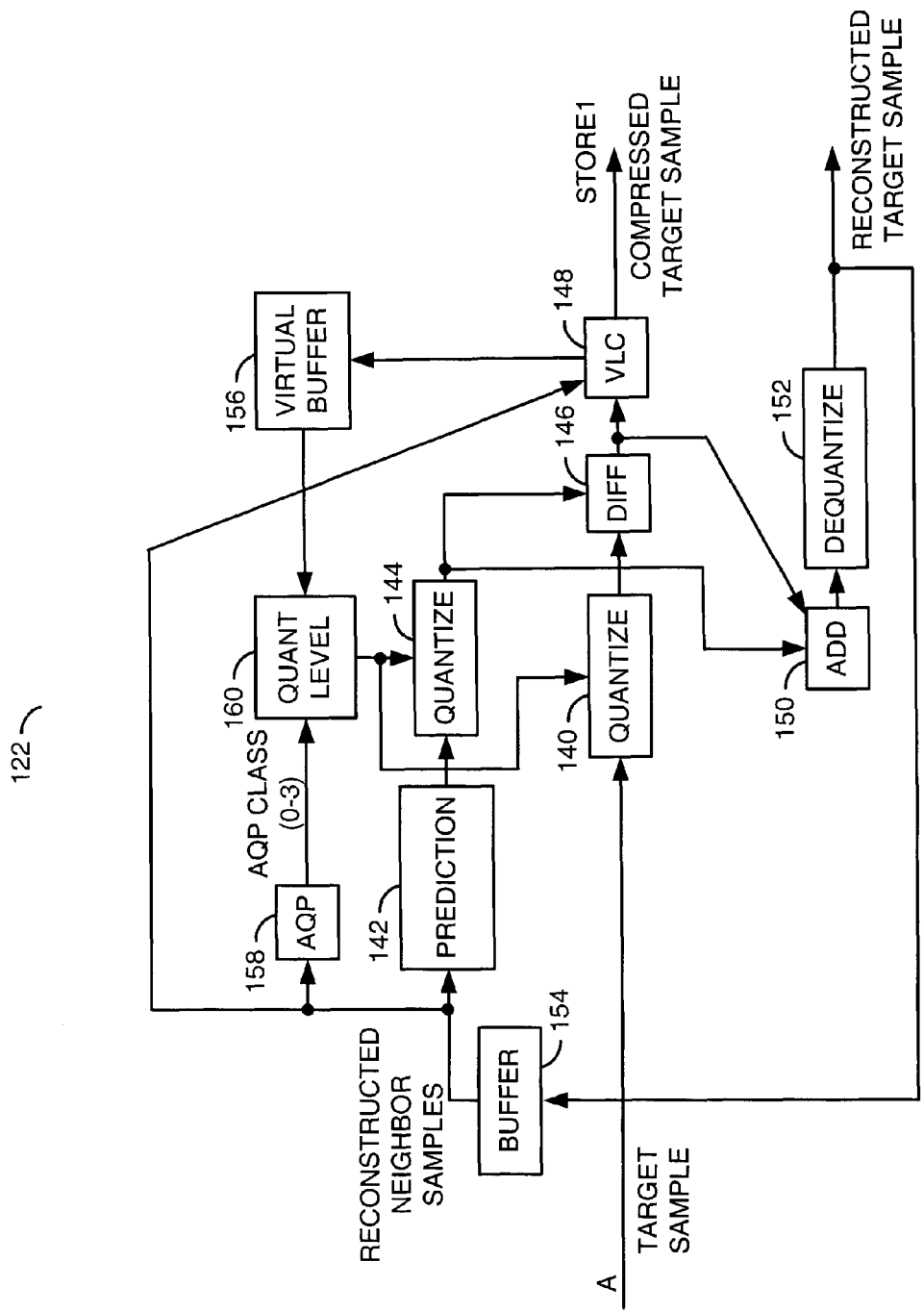
FIG. 3 is a block diagram of an example implementation of a compression circuit.

Referring to FIG. 3, a block diagram of an example implementation of the circuit 122 is shown. The circuit 122 generally comprises a circuit (or module) 140, a circuit (or module) 142, a circuit (or module) 144, a circuit (or module) 146, a circuit (or module) 148, a circuit (or module) 150, a circuit (or module) 152, a circuit (or module) 154, a circuit (or module) 156, a circuit (or module) 158 and a circuit (or module) 160. The circuits 140 to 160 may be implemented in hardware, software, firmware or any combination thereof. The signal A carrying the target YUV samples may be received by the circuit 140. The circuit 148 may present the compressed YUV samples in the signal STORE1.

The information used in the circuit 122 generally includes a target YUV sample to be compressed and reconstructed neighbor samples. The reconstructed neighbor samples may be samples that (i) are neighbors of the target YUV sample and (ii) have already been compressed and decompressed. "Reconstructed" generally means that the circuit 122 calculates the value of the neighbor samples to get the same values calculated by the circuits 123 and 124.

Figure 4:
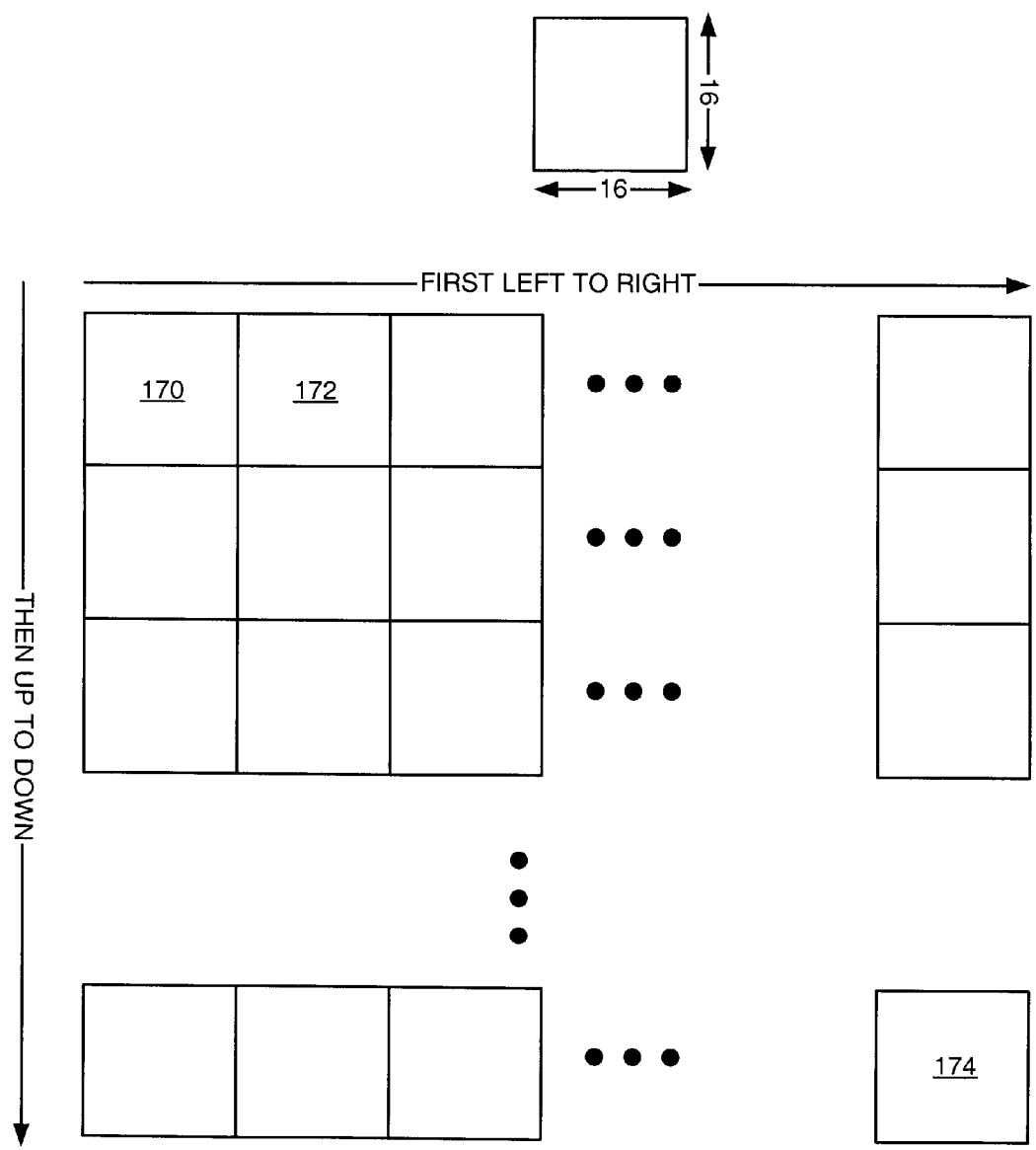
FIG. 4 is a diagram of an example YUV macroblock ordering.

Referring to FIG. 4, a diagram of an example YUV macroblock ordering is shown. In some embodiments, target YUV samples may be compressed in "macroblock" order. Thus, all of the YUV samples in an upper-left 16×16 block of pixels 170 may be compressed first, followed by the next 16×16 block 172 to the right, and so on, until the top 16 rows have been compressed. The next 16 rows may subsequently be compressed, followed by the next 16 rows, and so on, until the lower-right block 174 along the bottom of the picture is reached.

Figure 5:
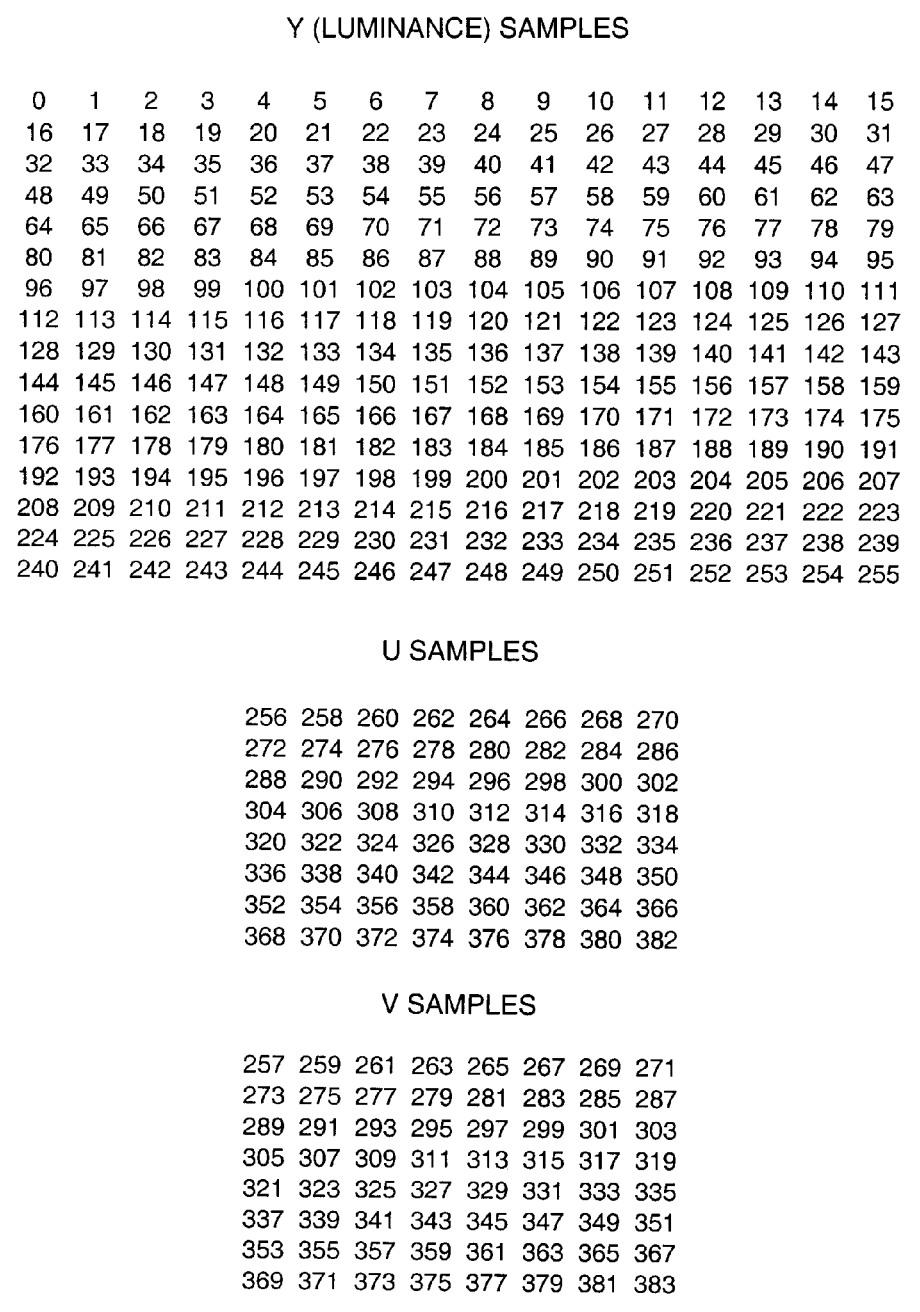

Referring to FIG. 5, a diagram of an example ordering of samples within a macroblock is shown. Pixels may be ordered in "raster order" within a macroblock. Luminance components (e.g., Y) of the pixels may be considered first followed by the chrominance components (e.g., U and V). Processing of the chrominance values may be interleaved between the U components and the V components. FIG. 5 generally illustrates 4:2:0 data in which the U components and the V components are each at one-half a Y vertical and one-half an X horizontal resolution. In some embodiments, the Y components may be compressed as a first compressed stream, and a combination of the U components and the V components may be compressed as a second compressed stream, with the Y compression on the one hand, and the U and V compression on the other, being done substantially simultaneously in parallel. Other orderings and ratios of the luminance components and the chrominance components may be implemented to meet the criteria of a particular application.

Referring again to FIG. 3, the circuit 140 may implement a quantization circuit. The circuit 140 is generally operational to compress a target YUV sample by quantization. The quantized target YUV sample may be presented to the circuit 146.

The circuit 142 may implement a prediction circuit. The circuit 142 may examine one or more reconstructed neighbor samples in the spatial neighborhood of the target YUV sample to calculate a prediction sample. The prediction sample may be transferred to the circuit 144. Reconstructed neighbor samples may be samples near the target YUV sample that have been "reconstructed". Since the compression may be lossy, the reconstructed sample values may not match the original sample values. The reconstructed neighbor samples may be used for (i) prediction (e.g., Differential Pulse Code Modulation), (ii) determining context (e.g., Huffman encode/decode) and (iii) Adaptive Quantization Parameter (AQP) classification.

Referring to FIG. 6, a diagram illustrating an example layout of reconstructed neighbor samples as related to a target sample is shown. The reconstructed neighbor samples may be designated as left, left-left, left-left-left, above, above-left, above left-left and above-right.

In some embodiments, reconstructed neighbor samples maybe limited to samples (i) in the same macroblock as the target sample being encoded (e.g., within the target macroblock) or (ii) in the macroblock to the left of the target macroblock. In other cases, one or more reconstructed neighbor samples may not be available. Specifically, a reconstructed neighbor sample is generally treated not available where the sample is (i) not in the picture—for example, a left sample on the left picture edge, a left-left sample one column to the right of the left picture edge, etc. or (ii) not in the target macroblock and not in macroblock to the left of the target macroblock. For example, a reconstructed target sample that should be an "above" sample may not be available where the target sample is in the top row of a macroblock or a picture. Unavailable left, left-left and left-left-left samples may be defaulted to a value of 128. Unavailable above, above-left, above-left-left and above-right samples may be calculated per different rules given for prediction, context and AQP.

The circuit 144 may implement another quantization circuit. The circuit 144 is generally operational to compress the prediction sample by quantization. The quantization level of the circuit 144 may match the quantization level of the circuit 140. The quantized prediction sample may be presented to the circuit 146.

The circuit 146 may implement a difference circuit. The circuit 146 may be operational to calculate a residual sample by subtracting the quantized prediction sample from the quantized target YUV sample. The residual sample may be transferred to the circuits 148 and 150.

The circuit 148 may implement a Variable Length Code (VLC) encoder. The circuit 148 is generally operational to encode a sequence of the residual samples into the signal STORE1. Since the residual samples only contain a difference between the target YUV samples and the neighbor prediction samples, the residual samples may be represented in the signal STORE1 using fewer bits than if the target YUV samples were directly encoded.

The circuit 150 may implement as an adder. The circuit 150 generally adds the quantized residual sample to the quantized prediction sample to reconstruct the quantized target YUV sample. The reconstructed target YUV sample may be transferred to the circuit 152.

The circuit 152 may implement a dequantization circuit. The circuit 152 generally performs an inverse quantization on the reconstructed quantized target YUV sample to generate a reconstructed target YUV sample. The reconstructed target samples created by the circuit 152 should match the reconstructed target samples created by the circuits 123 and 124.

The circuit 154 generally implements a buffer circuit. The circuit 154 may temporarily store the reconstructed neighbor samples used by the circuit 142 to generate the prediction sample. Each reconstructed target samples generated by the circuit 152 may be added to the pool of the reconstructed neighbor samples.

The circuit 156 may implement a virtual buffer. The circuit 156 may be operational to keep track of a bit rate of the signal STORE1. A fullness of the virtual buffer may be updated automatically during compression. The fullness may be updated every several (e.g., 8) samples as follows:

$$VB\_FULLNESS +=(BITS\_USED-BIT\_RATE)$$

Clip to[0,0x$FFFFFF$]

where BITS_USED may be the number of bits used by sample numbers N−16, . . . , N−8 and N is the number of the sample about to be compressed. The parameter BIT_RATE may be the target number of bits per sample in units of ⅛. For example, BIT_RATE=41 generally means a target bit rate of 5.125 bits/sample. The virtual buffer fullness (VB_FULLNESS) may be reported to the circuit 160.

The circuit 158 may implement an adaptive quantization parameter classification circuit. The circuit 158 may select a current quantization class among several (e.g., 4) possible adaptive quantization classes (e.g., classes 0-3). A first method may be used to select the quantization class for the luminance channel. A second method may be used to select the quantization class for the chrominance channels. In some embodiments, the two methods may be different from each other. In other embodiments, the two methods may be the same as each other.

The circuit 160 may implement a quantization level circuit. The circuit 160 generally calculates an appropriate quantization level for use by the circuits 140 and 144. The quantization level may be calculated based on the quantization class determined by the circuit 158 and the bit rate status determined by the circuit 156. A base 2 log of the quantization step size may be referred to as DPCM_LOSSY_SHIFT. A lookup function may be used to determine the base 2 log of the step size. The lookup may be based on the virtual buffer fullness and the AQP class. A value used in the calculation for the virtual buffer fullness may be the last virtual buffer fullness value computed by the circuit 156.

An index for the lookup may be computed based on the virtual buffer fullness as follows:

$$Index=Min(15,VB\_FULLNESS >> LOG\_VB\_SIZE\_MINUS\_4)$$

where ">>" means a right shift (e.g., divide by $2^{LOG\_VB\_SIZE\_MINUS\_4}$ and drop the fractional part). The base 2 log of the quantization step size may be computed with a lookup in a table as follows:

$$DPCM\_LOSSY\_SHIFT=SHIFT\_LOOKUP[Index][AQP\_class]$$

The table size may be 16×4×3 bits. In particular, the look-up may yield a 3-bit DPCM_LOSSY_SHIFT (e.g., value is 0-7) based on one of 16 possible values for "Index" (0 . . . 15) and one of 4 possible values for AQP_class (0 . . . 3). Table entries of zero generally mean a lossless encode. Therefore, the virtual buffer size may be $2^{LOG\_VB\_SIZE\_MINUS\_4+4}$.

Referring to FIG. 7, a diagram of example neighbor samples used to compute a prediction sample is shown. The prediction samples for chrominance may be calculated by the circuit 142. The prediction samples for luminance may also be calculated by the circuit 142. The prediction samples may be presented to the circuit 144 for quantization.

For chrominance samples, the AQP class may be a measure of the saturation near the target sample. The adaptive quantization class is generally computed from the following samples, (i) above same component, (ii) left same component, (iii) above other component and (iv) average of above-left and above right other component. Where above-right samples are not available, above-left other component may be substituted for above-right other component. If above samples are not available, the left sample may be substituted for all of the other samples. As used in the explanation, "component" generally means a chrominance component (e.g., CR, CB, U or V). For example, if the target sample is a CR sample "above same component" generally means the CR sample above the target sample, "above other component" may mean the CB sample above the target sample and so on.

A summation of the four samples described above may be calculated. A constant value (e.g., 512) may be subtracted from the sum. An absolute value of the difference may then be divided by 4. The result is generally compared to three programmable thresholds to select among the four AQP classes.

Figure 8:
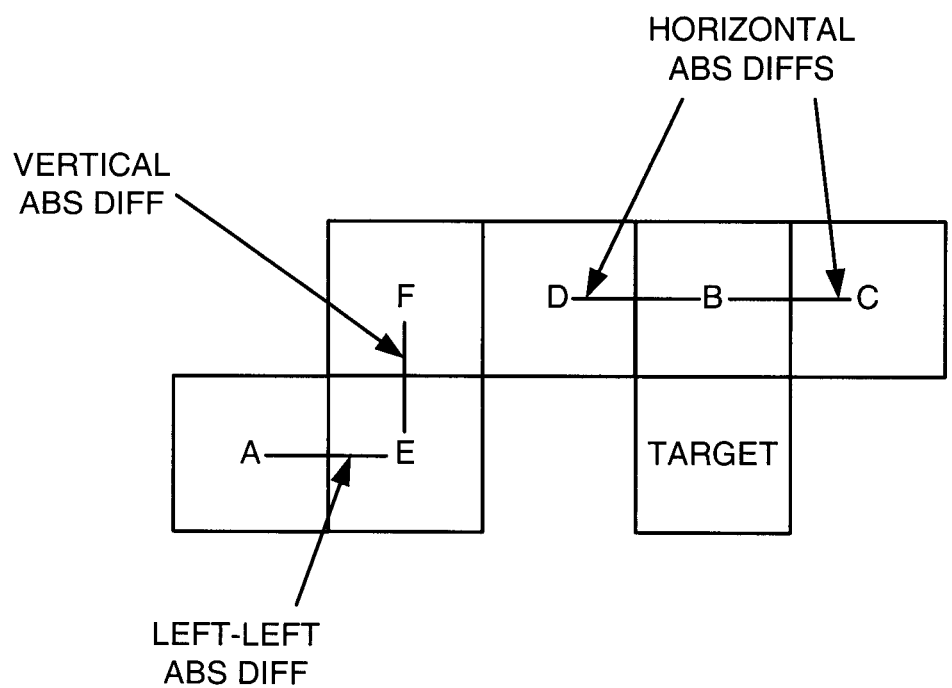
FIG. 8 is a diagram of samples used for luminance.

Referring to FIG. 8, a diagram of samples used for luminance AQP is shown. For the luminance channel the adaptive quantization class may be computed as follows. First, compute a sum of (i) the vertical absolute difference (see samples E and F) multiplied by two and (ii) the two horizontal absolute differences (e.g., samples A-E and D-C). On the right edge of the macroblock (where the above-right sample is not available), the left-most horizontal absolute difference (e.g., samples A-E) is added in a second time and the right-most horizontal absolute difference (e.g., samples B-C) may not be used. On the top of the macroblock, the left-left absolute difference (e.g., samples A-E) may be counted four times and the other absolute differences are not used. The sum may then be divided by four. The result of the division may be compared to the three thresholds to select among the four classes.

In some embodiments, the quantizations performed by the circuits 140 and 144 may use a pseudorandom process. For encoding each sample, a pseudo random number (e.g., D) in a range of $[-2^{DPCM\_LOSSY\_SHIFT-1}, 2^{DPCM\_LOSSY\_SHIFT-1}-1]$ may be computed if DPCM_LOSSY_SHIFT is greater than 0; else 0 may be used for the pseudorandom number D.

The pseudorandom process is generally used to randomize quantization bins used in both the quantization process and the dequantization (inverse quantization) process. The randomization of the quantization bins may prevent sequences of slowly-varying data sample values from creating distinct contours in recovered sample values at the end of the dequantization process. Randomization of the quantization bins may be synchronized between the compression process and the decompression process such that for each given sample, both processes utilize a same randomized quantization bin to operate on the given samples. The pseudorandom process generally establishes one or more sequences of pseudorandom values. Pairing of the data samples with the corresponding pseudorandom values may be based on one or more of temporal positions of the data samples, spatial positions of the data samples and/or frequency positions of the data samples (e.g., data samples are transform coefficients).

Randomization of the quantization bins during compression may be achieved by adjusting the original data samples with corresponding pseudorandom values prior to quantization. For example, a quantized sample (e.g., Q) may be calculated as Q=floor((X−D1(K))/S), where X may be an original data sample, K may represent a temporal position, a spatial position and/or a frequency position of the sample X, D1(K) may be a pseudorandom value based on K, and S may represent a quantization step size. The function "floor(A/B)" may choose the largest integer that is not smaller than A/B (e.g., drop the fractional part). The randomization process effectively offsets the positions of the randomized quantization bins from the positions of the non-randomized quantization bin. Other adjustments may be implemented to meet the criteria of a particular application.

Randomization of the quantization bins during decompression may be achieved by adjusting decompressed samples with the corresponding pseudorandom values after dequantization. For example, a recovered sample (e.g., T) may be calculated as T=(S×Q)+C+D2(K), where C may be a constant offset and D2(K) may be a pseudorandom value based on K. In some embodiments, the pseudorandom values D1(K)=D2(K) for all values of K. In other embodiments, the pseudorandom values D1(K)≠D2(K). Other adjustments may be implemented to meet the criteria of a particular application. Additional details regarding the pseudorandom process may be found in co-pending U.S. application, application Ser. No. 12/570,104.

Figure 9:
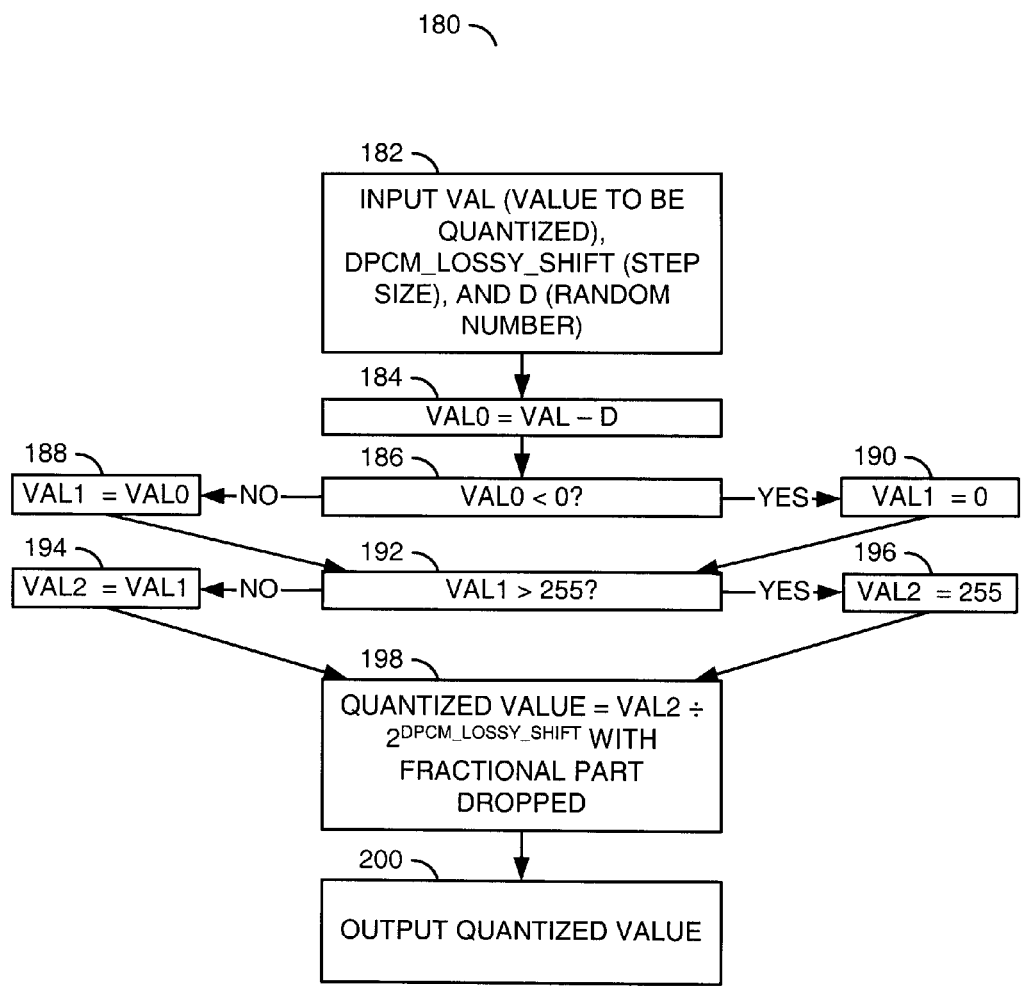
FIG. 9 is a flow diagram of an example implementation of a quantization method.

Referring to FIG. 9, a flow diagram of an example implementation of a quantization method 180 is shown. The method (or process) 180 may be implemented by the circuit 140 and the circuit 144. The method 180 generally comprises a step (or block) 182, a step (or block) 184, a step (or block) 186, a step (or block) 188, a step (or block) 190, a step (or block) 192, a step (or block) 194, a step (or block) 196, a step (or block) 198 and a step (or block) 200. A step size of the quantization may be $2^{DPCM\_LOSSY\_SHIFT}$. A location of the quantization points may be offset by the pseudorandom number D.

In the step 182, a sample (e.g., VAL) to be quantized may be received. A first intermediate sample (e.g., VAL0) may be calculated from the sample VAL and the pseudorandom value D in the step 184. The sample VAL0 may be compared with a minimum threshold (e.g., 0) in the step 186. If the sample VAL0 is not less than the minimum threshold (e.g., the NO branch of step 186), a second intermediate sample (e.g., VAL1) may be set to the sample VAL0 in the step 188. If the sample VAL0 is less than the minimum threshold (e.g., the YES branch of step 186), the sample VAL1 may be set to the threshold in the step 190.

In the step 192, the sample VAL1 may be compared with a maximum threshold (e.g., 255). If the sample VAL1 is not greater than the maximum threshold (e.g., the NO branch of step 192), a third intermediate sample (e.g., VAL2) may be set to the sample VAL1 in the step 194. If the sample VAL1 is greater than the maximum threshold (e.g., the YES branch of step 192), the sample VAL2 may be set to the maximum threshold in the step 196.

In the step 198, a quantized value (e.g., VAL3) may be calculated. A fractional part of the quantized value may be dropped in the process. The resulting quantized value may be output from the method 180 in the step 200. The method 180 may be repeated for each sample to be quantized.

Figure 10:
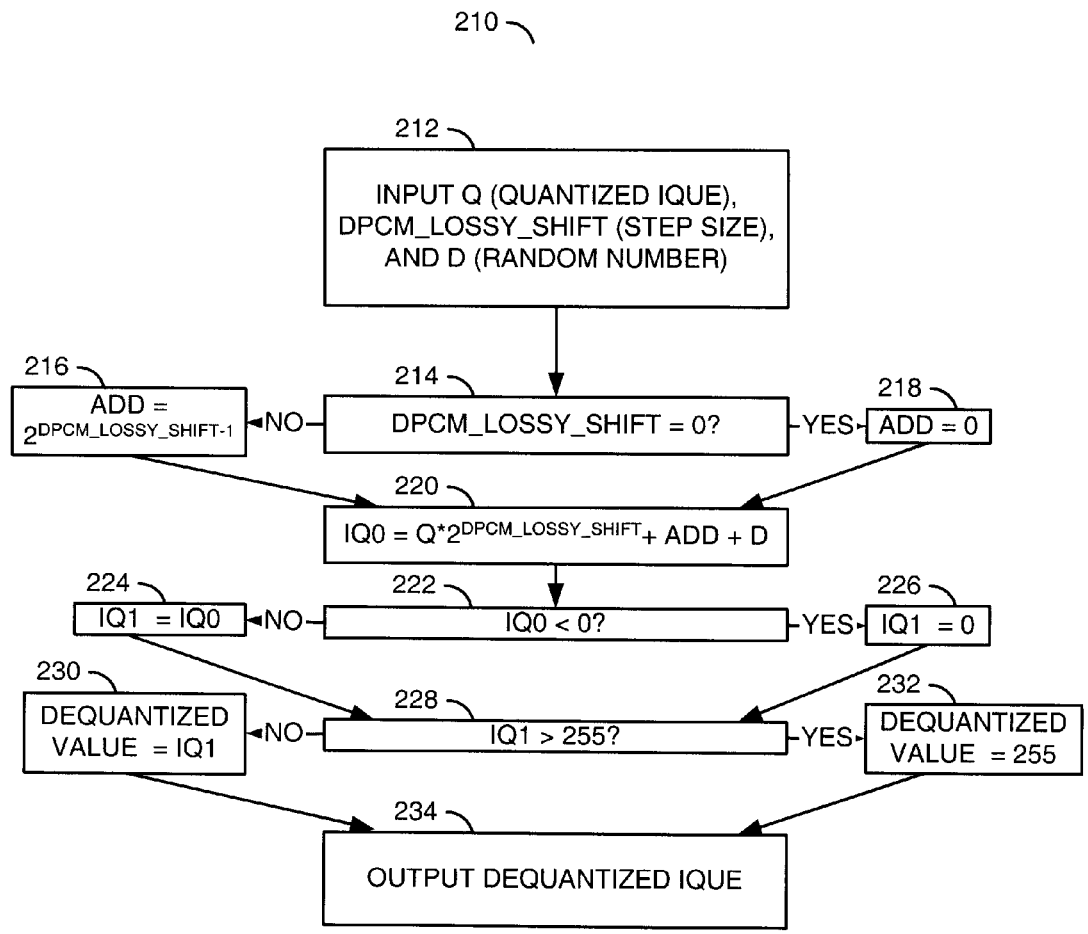
FIG. 10 is a flow diagram of an example implementation of a dequantization method.

Referring to FIG. 10, a flow diagram of an example implementation of a dequantization method 210 is shown. The method (or process) 210 may be implemented by the circuit 152. The method 210 generally comprises a step (or block) 212, a step (or block) 214, a step (or block) 216, a step (or block) 218, a step (or block) 220, a step (or block) 222, a step (or block) 224, a step (or block) 226, a step (or block) 228, a step (or block) 230, a step (or block) 232 and a step (or block) 234. A step size of the dequantization may be $2^{DPCM\_LOSSY\_SHIFT}$. Dequantization may be done to the middle of the quantization bins.

In the step 212, the sample to be dequantized (e.g., Q) may be received. The value of DPCM_LOSSY_SHIFT may be checked in the step 214 for a non-lossy value. If DPCM_LOSSY_SHIFT indicates a lossy quantization (e.g., the NO branch of step 214), an offset (e.g., ADD) may set to one-half the step size in the step 216. If DPCM_LOSSY_SHIFT indicates a lossless quantization (e.g., the YES branch of step 214), the offset ADD may be set to zero in the step 218.

A first intermediate value (e.g., IQ0) may be calculated in the step 220. The first intermediate value IQ0 may be compared to the minimum threshold in the step 222. If the value IQ0 is not less than the minimum threshold (e.g., the NO branch of step 222), a second intermediate value (e.g., IQ1) may be set to the value IQ0 in the step 224. If the value IQ0 is less than the minimum threshold (e.g., the YES branch of step 222), the value IQ1 may be set to the minimum threshold in the step 226.

In the step 228, the value IQ1 may be compared with the maximum threshold. If the value IQ1 is not greater than the maximum threshold (e.g., the NO branch of step 228), a dequantized value (e.g., IQ2) may be set to the value IQ1 in the step 230. If the value IQ1 is greater than the maximum threshold (e.g., the YES branch of step 228), the dequantized value IQ2 may be set to the maximum threshold in the step 232. In the step 234, the dequantized value may be presented from the circuit 152 (e.g., the reconstructed target sample).

Referring to FIG. 11, a diagram of example neighbor samples used to compute a context score is shown. The chrominance context score may be calculated by the circuit 148. The luminance context score may also be calculated by the circuit 148. The context scores may be used in the variable length coding of the residual samples to generate the signal STORE1.

Figure 12:
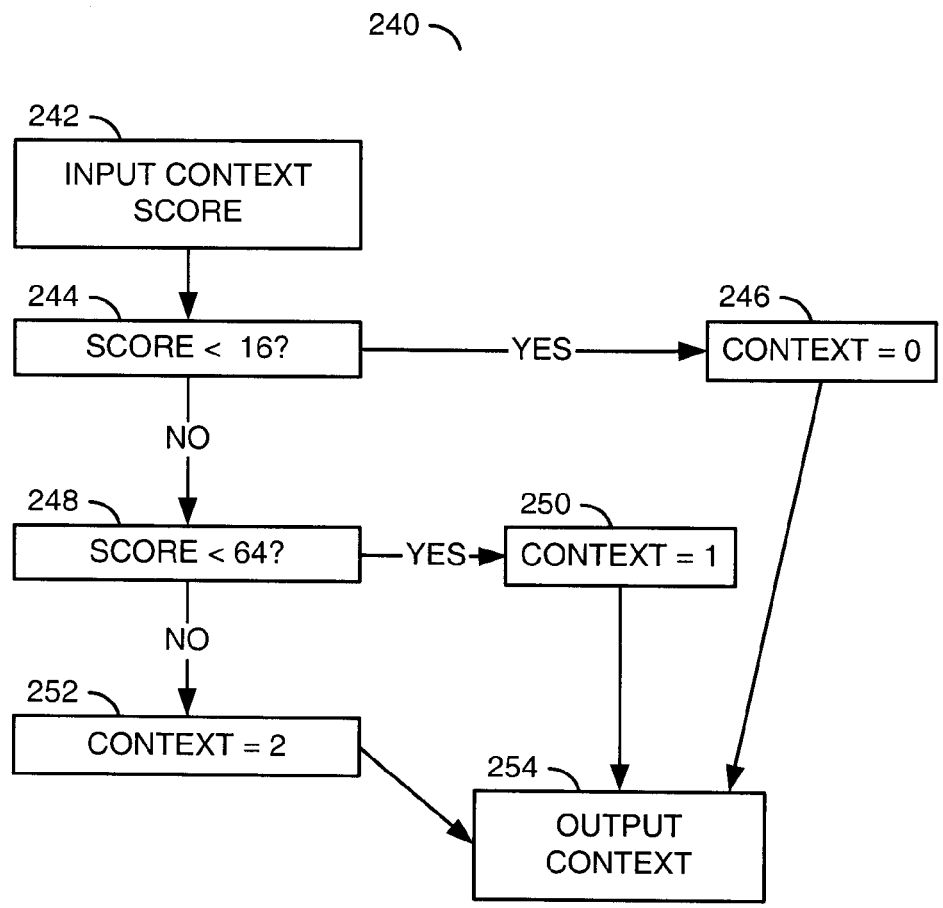
FIG. 12 is a flow diagram of an example method to select a context.

Referring to FIG. 12, a flow diagram of an example method 240 to select the context is shown. The method (or process) 240 may be implemented by the circuit 148. The method 240 generally comprises a step (or block) 242, a step (or block) 244, a step (or block) 246, a step (or block) 248, a step (or block) 250, a step (or block) 252 and a step (or block) 254. The context may be based on the context scores determined in FIGS. 12 and 13.

In the step 242, the context score of the target sample may be received. A comparison of the context score with a low threshold (e.g., 16) may be performed in the step 244. If the context score is less than the low threshold (e.g., the YES branch of step 244), the context may be set to a first state (e.g., 0) in the step 246. If the context score is not less than the low threshold (e.g., the NO branch of step 244), the context score may be compared with a high threshold (e.g., 64). If the context score is less than the high threshold (e.g., the YES branch of step 248), the context may be set to a second state (e.g., 1) in the step 250. If the context score not less than the high threshold (e.g., the NO branch of step 252), the context may be set to a third state (e.g., 2) in the step 252. Once the context has been set in the steps 246, 250 or 252, the context may be presented in the step 254.

Quantization of 8-bit samples with log base 2 of quantization step size=PCM_LOSSY_SHIFT may uses 8-PCM_LOSSY_SHIFT bits. Therefore, both inputs to the difference circuit 146 in FIG. 3 may use 8-PCM_LOSSY_SHIFT bits. A difference between two B-bits numbers (e.g., B0 and B1) may be uniquely represented by B-bits, specifically, the B least significant bits of B0-B1. The resulting $B=2^{PCM\_LOSSY\_SHIFT}$ bits, that are generally thought of as a signed $2^{PCM\_LOSSY\_SHIFT}$ number (or coefficient), that may be Huffman encoded.

Referring to FIG. 13, a Table I illustrating a variable length code (VLC) is shown. Each coefficient generally uses a variable length code, sometimes followed by a fixed length code (FLC). Table I generally shows the VLC used to represent the difference (denoted as DIFF) between the quantized target sample and the prediction sample based on the absolute value of DIFF and the context.

When abs(DIFF)>0 and abs(DIFF)≤63, the FLC is generally made up of:
1. The sign of DIFF (1 bit).
2. (For abs(DIFF)≥4)) the value of abs(DIFF)−lowest possible value of abs(DIFF).

As such, the FLC+VLC together may exactly represent the DIFF. For example:
1. DIFF=0: VLC shows that abs(DIFF)=0, so no FLC.
2. DIFF=−2: VLC shows that abs(DIFF)=2, so FLC (sign bit) generally shows that DIFF=−2.
3. DIFF=12: VLC shows that abs(DIFF) is in a range of [8 . . . 15], so FLC may be made up of the sign bit and additional bits. The sign bit may show that DIFF is positive. Where the additional bits represents 4, DIFF=8+4=12.
4. "ALL OTHERS" case: PCM_LOSSY_SHIFT=6. The FLC may be 22, so DIFF=22.

Figure 14:
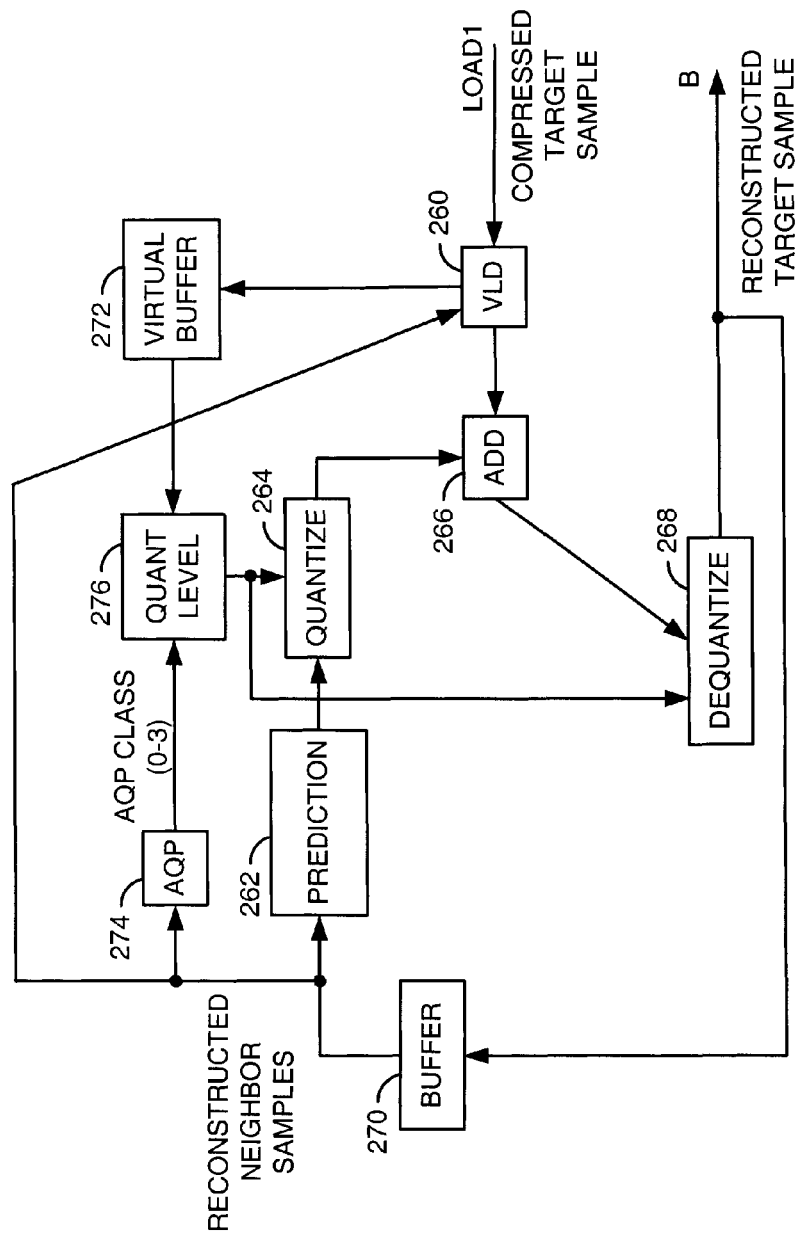
FIG. 14 is a block diagram of an example implementation of a decompression circuit.

Referring to FIG. 14, a block diagram of an example implementation of the circuits 123 and 124 is shown. Each of the circuits 123 and 124 generally comprises a circuit (or module) 260, a circuit (or module) 262, a circuit (or module) 264, a circuit (or module) 266, a circuit (or module) 268, a circuit (or module) 270, a circuit (or module) 272 and a circuit (or module) 274. The circuits 260 to 274 may be implemented in hardware, software, firmware or any combination thereof. The signal LOAD1 (e.g., LOAD1A or LOAD1B) carrying the compressed target YUV samples may be received by the circuit 260. The circuit 268 may present the reconstructed YUV samples in the output signal (e.g., B or C).

The circuit 260 may implement a Variable Length Decoder (VLD) circuit. The circuit 260 is generally operational to decode a sequence of the quantized residual samples received in the signal LOAD1. The circuit 260 generally reverses the encoding operation of the circuit 148 (FIG. 3) to recreate the quantized residual samples. A decompression order may be the same as the compression order. Context selection in the circuit 260 may be the same as in the circuit 148. The circuit 260 may also use the same Huffman tables same as the circuit 148.

The circuit 262 may implement a prediction circuit. The circuit 262 may examine one or more reconstructed samples in the spatial neighborhood of the to-be reconstructed target sample to calculate a prediction sample. The prediction sample may be transferred to the circuit 264. The reconstructed neighbor samples may be used for (i) prediction (e.g., Differential Pulse Code Modulation), (ii) determining context (e.g., Huffman encode/decode) and (iii) adaptive quantization parameter classification. In some embodiments, the circuit 262 may be similar to the circuit 142. Definitions, utilizations, lists, and unavailability of the reconstructed neighbor samples in the circuit 262 may be the same as in the circuit 142 so that the circuit 262 chooses the same prediction samples as the circuit 142.

The circuit 264 may implement a quantization circuit. The circuit 264 is generally operational to compress the prediction sample by quantization. The circuit 264 may be a copy of the quantization of the circuit 144 so that both use the same quantization level. In some embodiments, the circuit 264 and the circuit 144 may be configured to use the same pseudorandom process in quantizing the samples. The quantized prediction sample may be presented to the circuit 266.

The circuit 266 may implement an adder circuit. The circuit 266 may be operational to calculate a reconstructed quantized target sample by adding the quantized prediction sample to the quantized residual sample. The circuit 266 may undo the subtraction of the quantized prediction sample performed by the circuit 146. The residual sample may be transferred to the circuit 268.

The circuit 268 may implement a dequantization circuit. The circuit 268 generally performs an inverse quantization on the reconstructed quantized target YUV sample to generate the reconstructed target YUV sample. In some embodiments, the circuit 268 may be a copy of the circuit 152. The reconstructed target samples created by the circuit 268 should match the reconstructed target samples created by the circuit 152.

The circuit 270 generally implements a buffer circuit. The circuit 270 may temporarily store the reconstructed neighbor samples used by the circuit 262 to generate the prediction sample. Each reconstructed target samples generated by the circuit 268 may be added to the pool of reconstructed neighbor samples.

The circuit 272 may implement a virtual buffer. The circuit 272 may be operational to keep track of bit rate of the signal LOAD1. A fullness of the virtual buffer may be updated automatically during decompression. The fullness may be updated every several (e.g., 8) samples in a manner similar to the circuit 156.

The circuit 274 may implement an adaptive quantization parameter classification circuit. The circuit 274 may select a current quantization class among several (e.g., 4) possible adaptive quantization classes (e.g., classes 0-3). A first method may be used to select the quantization class for the luminance channel. A second method may be used to select the quantization class for the chrominance channels. In some embodiments, the two methods may be different from each other. In other embodiments, the two methods may be the same as each other. The circuit 274 may be a copy of the circuit 158 in some embodiments and may use the same AQP classes.

The circuit 276 may implement a quantization level circuit. The circuit 276 generally calculates an appropriate quantization level for use by the circuit 264. The quantization level may be calculated based on the quantization class determined by the circuit 274 and the bit rate status determined by the circuit 272. A log base 2 of the quantization step size may be referred to as DPCM_LOSSY_SHIFT. A lookup may be used to determine the log of the step size. The lookup may be based on the virtual buffer fullness and the AQP class. A value used in the calculation for the virtual buffer fullness may be the last virtual buffer fullness value computed by the circuit 272. In some embodiments, the circuit 276 may be a copy of the circuit 160 so that the circuit 276 selects a same quantization step size as the circuit 160.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first encoder configured to (i) generate a plurality of first compressed samples in a spatial domain from a plurality of data samples of a picture in said spatial domain and (ii) store said first compressed samples in a memory, wherein (a) said data samples comprise a plurality of luminance samples and chrominance samples created internal to a digital video camera, (b) said memory is completely inside said digital video camera and (c) said memory is a solid state memory;
a first decoder configured to (i) read said first compressed samples from said memory and (ii) generate a plurality of reconstructed samples from said first compressed samples, wherein said reconstructed samples comprise said luminance samples and said chrominance samples as decoded; and
a second encoder separate from said first encoder and configured to (i) receive said reconstructed samples directly from said first decoder, (ii) generate a plurality of second compressed samples based on said reconstructed samples and (iii) store said second compressed samples in said memory.

2. The apparatus according to claim 1, wherein said first encoder and said second encoder use different video compression formats.

3. The apparatus according to claim 1, wherein said first compressed samples are kept internal to said digital video camera, the apparatus further comprising a circuit configured to read said second compressed samples from said memory and present said second samples in a bitstream signal external to said apparatus.

4. The apparatus according to claim 1, wherein (i) said first compressed samples are stored from said first encoder to said memory in a first order, (ii) said first compressed samples are loaded from said memory to said first decoder in a second order and (iii) said second order is different than said first order.

5. The apparatus according to claim 1, further comprising a second decoder separate from said first decoder and configured to (i) read said first compressed samples from said memory and (ii) generate a plurality of internal samples from said first compressed samples.

6. The apparatus according to claim 5, further comprising a processor configured to (i) generate image data by motion compensated temporal filtering based on said internal samples and (ii) transfer said image data to said first encoder.

7. The apparatus according to claim 1, wherein said first encoder comprises (i) a first quantizer configured to quantize a target one of said luminance samples or said chrominance samples alone, (ii) a second quantizer configured to quantize a prediction sample that corresponds to said target sample alone and (iii) a subtractor configured to generate a residual sample by subtracting said quantized prediction sample from said quantized target sample.

8. The apparatus according to claim 1, wherein said first decoder comprises (i) a quantizer configured to quantize a prediction sample that corresponds to a target one of said first compressed samples alone, (ii) an adder configured to generate a sum sample by adding said quantized prediction sample to said target first compressed sample and (iii) a dequantizer configured to generate one of said reconstructed samples by dequantizing said sum sample.

9. The apparatus according to claim 1, wherein said first encoder comprises a quantization circuit configured to compress said data samples using a pseudorandom quantization.

10. The apparatus according to claim 9, wherein said pseudorandom quantization is configured to (i) generate a size signal having a quantization step size corresponding to said data samples, said data samples reside in a range of numbers, (ii) generate a plurality of randomized quantization bins in said range based on a pseudorandom process and (iii) generate said first compressed samples by quantizing said data samples based on said randomized quantization bins.

11. A method for internal data sample compression in a digital video camera, comprising the steps of:
(A) generating a plurality of first compressed samples in a spatial domain from a plurality of data samples of a picture in said spatial domain using a first encoder of a circuit, wherein said data samples comprise a plurality of luminance samples and chrominance samples created internal to said digital video camera;
(B) storing said first compressed samples in a memory, wherein (i) said memory is completely inside said digital video camera and (ii) said memory is a solid state memory;
(C) generating a plurality of reconstructed samples from said first compressed samples read from said memory using a first decoder, wherein said reconstructed samples comprise said luminance samples and said chrominance samples as decoded;
(D) generating a plurality of second compressed samples based on said reconstructed samples received directly from said first decoder using a second encoder separate from said first encoder; and
(E) storing said second compressed samples in said memory.

12. The method according to claim 11, wherein said first encoder and said second encoder use different video compression formats.

13. The method according to claim 11, wherein (i) said first compressed samples are kept internal to said digital video camera and (ii) said second compressed samples are read from said memory and presented in a bitstream signal external to said digital video camera using a circuit.

14. The method according to claim 11, further comprising the steps of:
storing said first compressed samples from said first encoder to said memory in a first order; and
loading said first compressed samples from said memory to said first decoder in a second order, wherein said second order is different than said first order.

15. The method according to claim 11, further comprising the steps of:
reading said first compressed samples from said memory to a second decoder separate from said first decoder; and
generating a plurality of internal samples from said first compressed samples using said second decoder.

16. The method according to claim 15, further comprising the steps of:
generating image data by motion compensated temporal filtering based on said internal samples; and
transferring said image data to said first encoder.

17. The method according to claim 11, wherein step (A) comprises the sub-steps of:
quantizing a target one of said luminance samples or said chrominance samples alone;
quantizing a prediction sample that corresponds to said target sample alone; and
generating a residual sample by subtracting said quantized prediction sample from said quantized target sample.

18. The method according to claim 11, wherein step (B) comprises the sub-steps of:
quantizing a prediction sample that corresponds to a target one of said first compressed samples alone;
generating a sum sample by adding said quantized prediction sample to said target first compressed sample; and
generating one of said reconstructed samples by dequantizing said sum sample.

19. The method according to claim 11, wherein step (A) comprises the sub-step of:
pseudorandom quantizing said data samples.

20. An apparatus comprising:
means for first encoding configured to generate a plurality of first compressed samples in a spatial domain from a plurality of data samples of a picture in said spatial domain, wherein said data samples comprise a plurality of luminance samples and chrominance samples created internal to a digital video camera;
means for storing said first compressed samples in a memory, wherein (a) said memory is completely inside said digital video camera and (b) said memory is a solid state memory;
means for decoding configured to generate a plurality of reconstructed samples from said first compressed samples read from said memory, wherein said reconstructed samples comprise said luminance samples and said chrominance samples as decoded;
means for second encoding separate from said means for first encoding and configured to generate a plurality of second compressed samples based on said reconstructed samples received directly from said means for decoding; and
means for storing said second compressed samples in said memory.

* * * * *